July 29, 1969
H. R. KANN
3,458,052
STRUCTURAL SUPPORT ARRANGEMENT AND METHOD OF ASSEMBLING
Filed Oct. 21, 1965
5 Sheets-Sheet 1
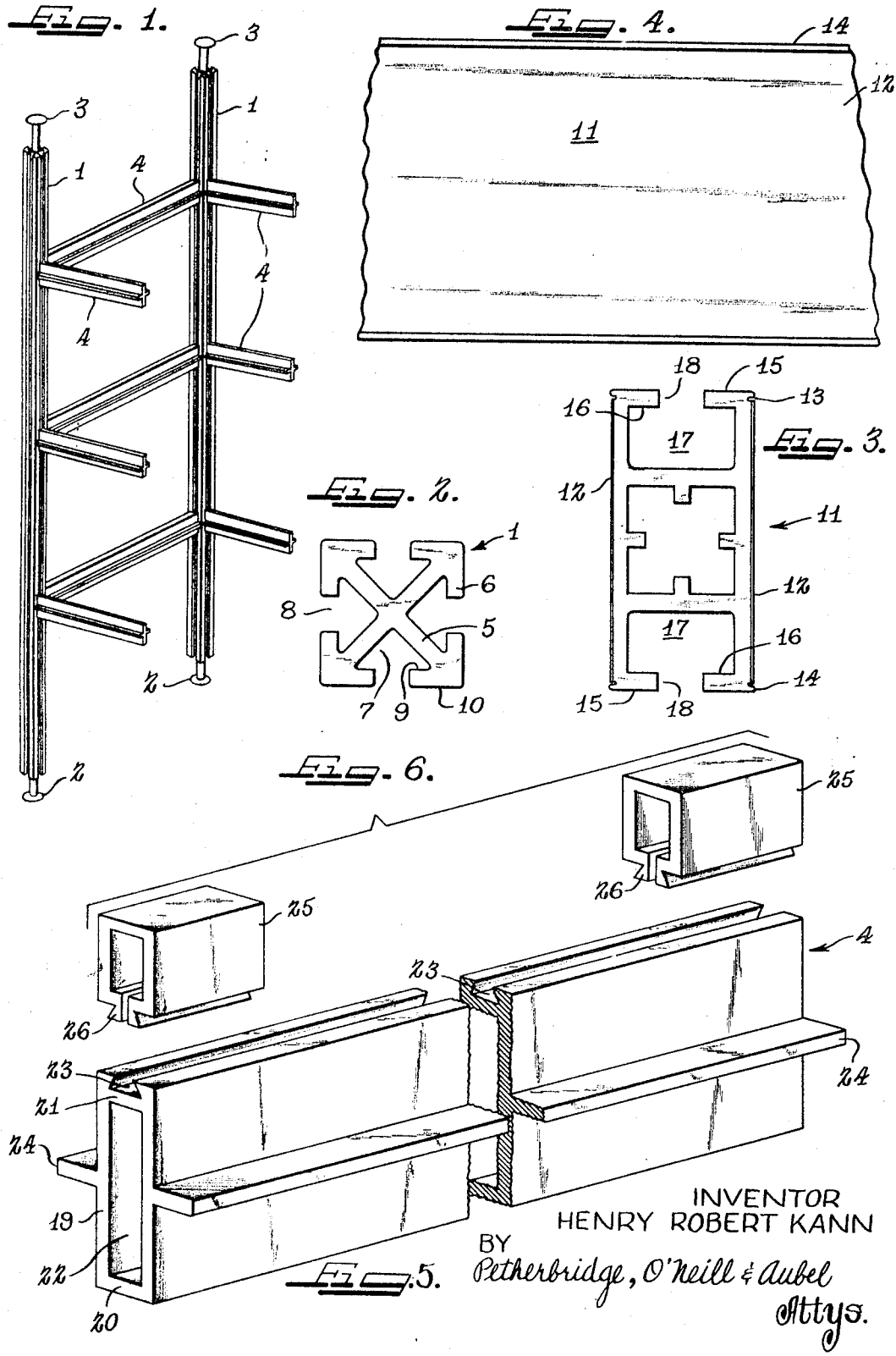
INVENTOR
HENRY ROBERT KANN
BY Petherbridge, O'Neill & Aubel
Attys.

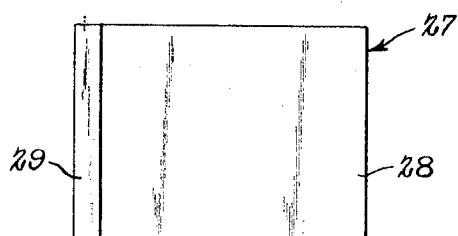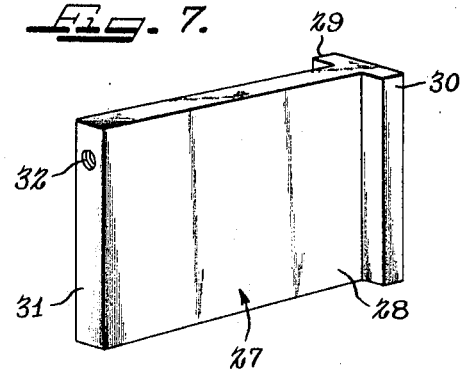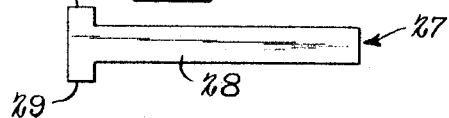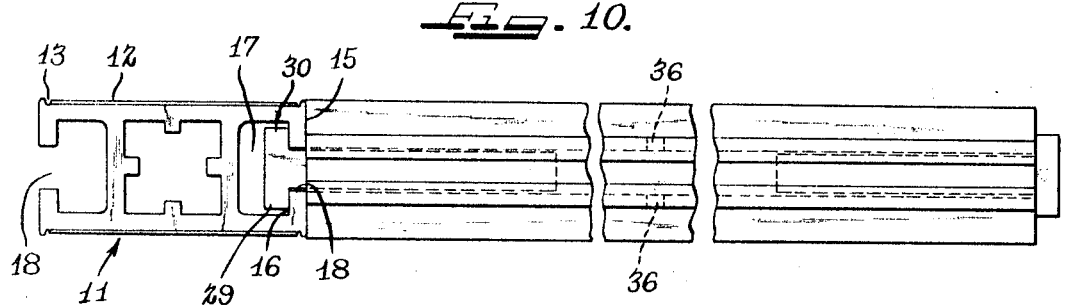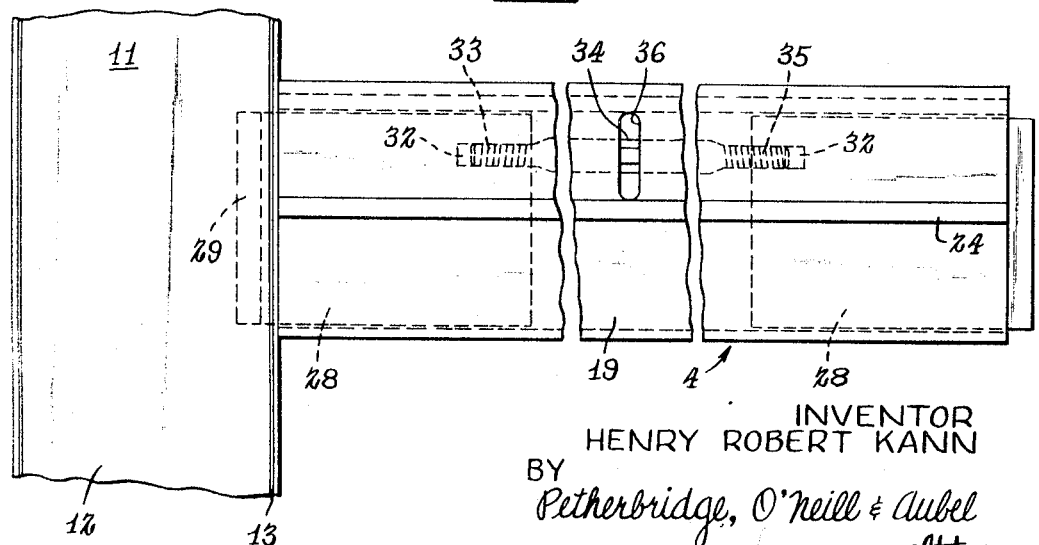

July 29, 1969 H. R. KANN 3,458,052
STRUCTURAL SUPPORT ARRANGEMENT AND METHOD OF ASSEMBLING
Filed Oct. 21, 1965 5 Sheets-Sheet 3
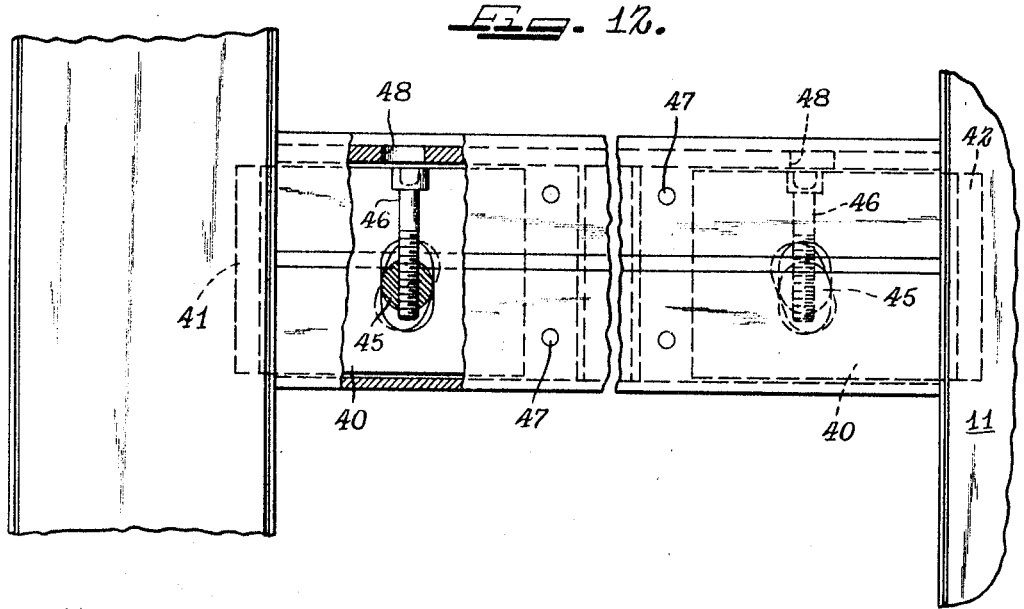
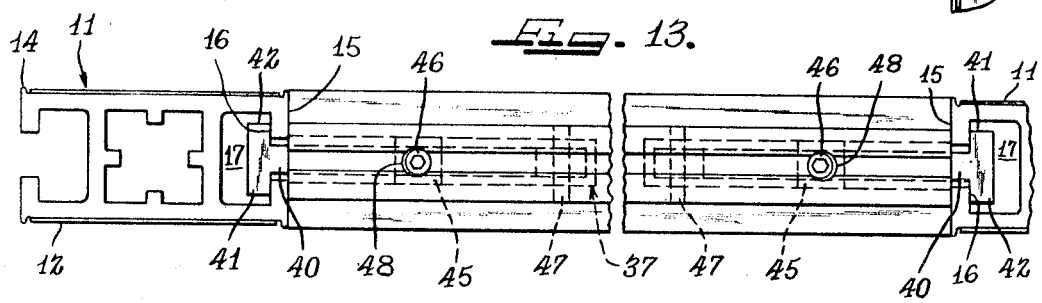
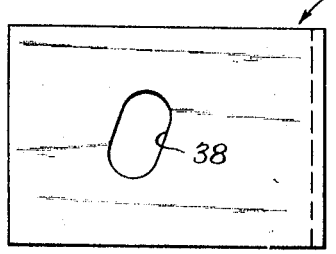
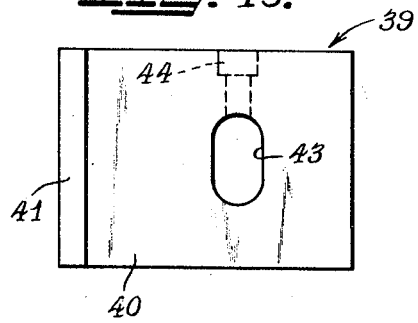
INVENTOR
HENRY ROBERT KANN
BY Petherbridge, O'Neill & Aubel
Attys.

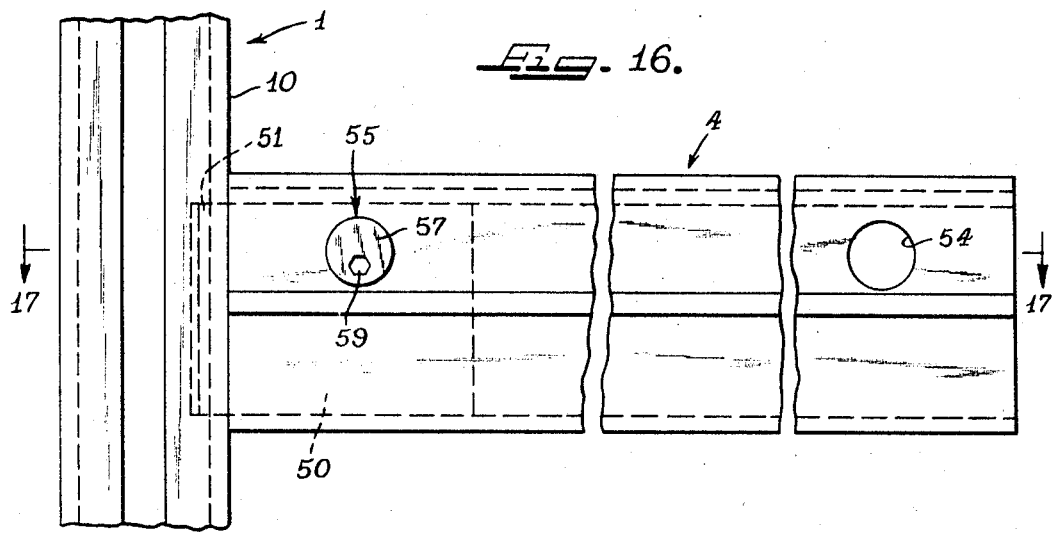
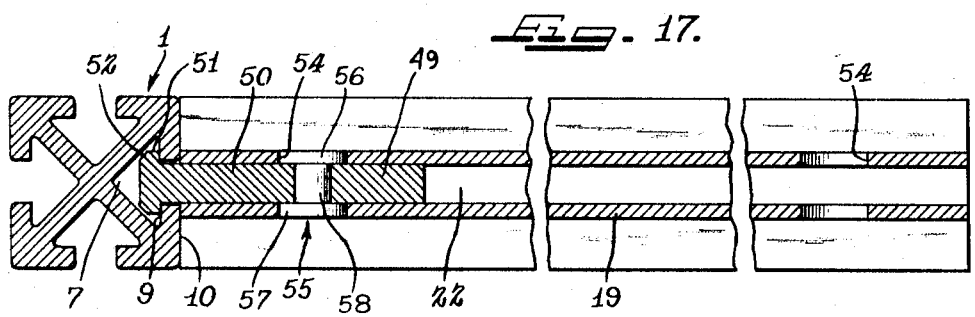
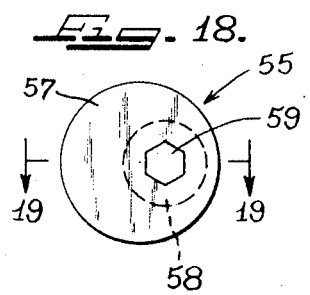
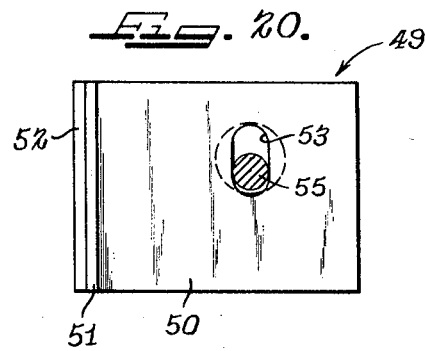
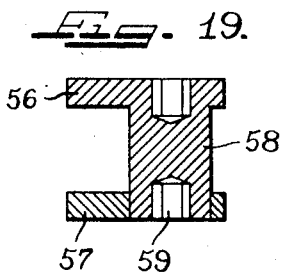

July 29, 1969  H. R. KANN  3,458,052
STRUCTURAL SUPPORT ARRANGEMENT AND METHOD OF ASSEMBLING
Filed Oct. 21, 1965  5 Sheets-Sheet 5
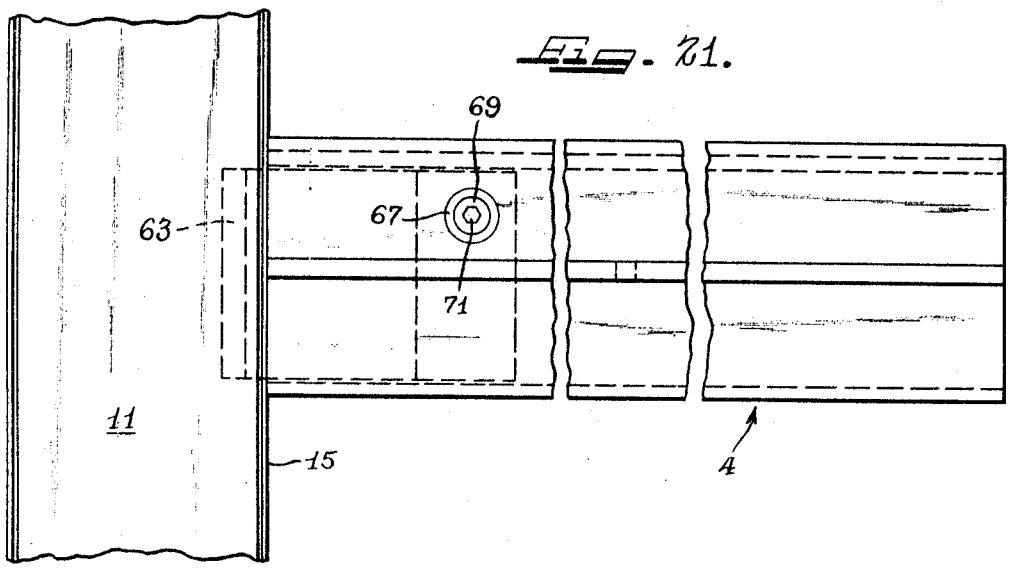
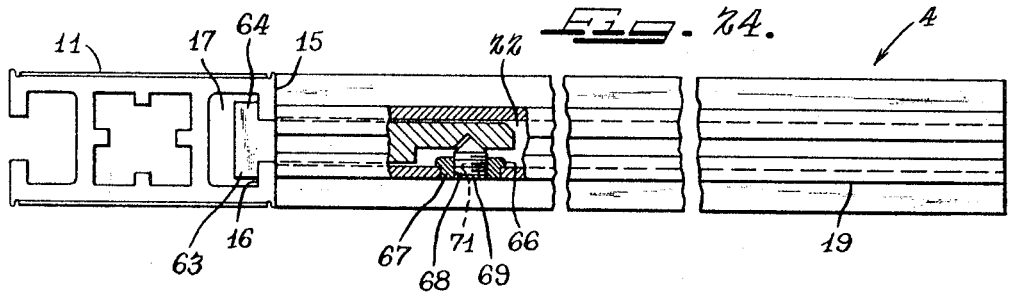
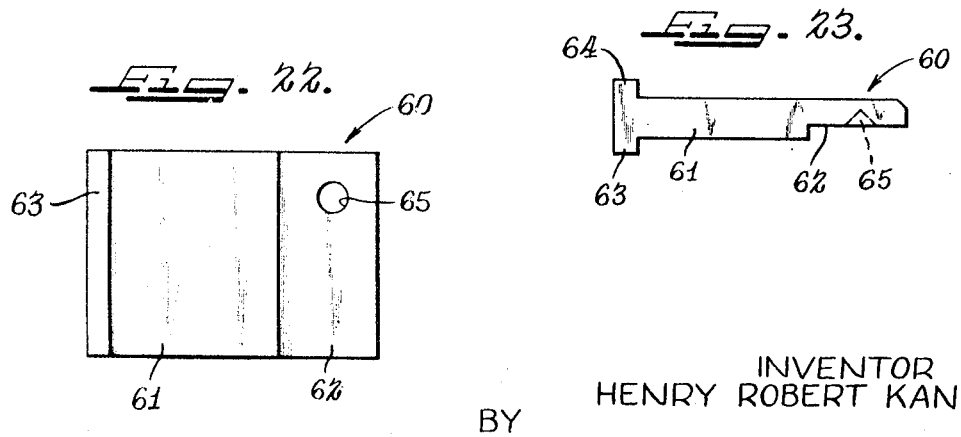
INVENTOR
HENRY ROBERT KANN
BY
Petherbridge, O'Neill & Aubel
Attys.

United States Patent Office 3,458,052
Patented July 29, 1969

3,458,052
STRUCTURAL SUPPORT ARRANGEMENT
AND METHOD OF ASSEMBLING
Henry Robert Kann, New York, N.Y., assignor to Aluminum Extrusions, Inc., Charlotte, Mich., a corporation of Michigan
Filed Oct. 21, 1965, Ser. No. 499,371
Int. Cl. A47f 5/10; A47g 29/02
U.S. Cl. 211—176                     20 Claims

ABSTRACT OF THE DISCLOSURE

A construction utilizing combinations of interengaging poles, brackets and panels for use in furnishing or storage applications. The poles and brackets are formed with interlocking constructions permitting their assembly in a variety of structural arrangements. The panels are designed to cooperate with the poles and brackets to produce storage or support units in a variety of sizes and configurations. The combination of poles, brackets and panels is designed to permit expeditious and attractive assembly of support units in almost any setting.

---

This invention relates to the construction of interengaging poles, brackets and panels and to the method of assembling these elements to provide a variety of structural arrangements.

Pole supported furnishings, in general, have been in use for a number of years. Such pole furnishings generally utilized a number of vertically supported poles for the base of the structure to be erected. A horizontal shelf or bracket member was ordinarily secured to these vertical mounted poles. The pole and the bracket structure formed the supporting skeleton or foundation for the structure being erected. Normally, preformed panels or cabinetry was then secured to the supporting pole and bracket structure. In erecting such structures considerable time and effort was devoted to establishing the precise vertical alignment of each of the vertical support poles and to the secure connection and alignment of the horizontally extending brackets to the poles. Often, even after great care was taken to properly align and mount a bracket, the tolerances were such that the bracket remained loosely connected to the pole and did not maintain the desired horizontal alignment with respect to the vertical pole. Even where the manufacturing tolerances of the abutting surfaces or the poles and brackets were close, the weight of the panels or cabinetry connected to them was sufficient to distort the poles or brackets or both. Someimes too, to develop a high degree of rigidity between the poles and the brackets a number of additional brackets were made to span more than one pole to produce a more solid load bearing base structure.

The present invention provides an improved supporting structure and means for connecting panels to this structure to achieve a desired composite construction. The brackets and poles of the invention are made in a manner such that it is necessary to vertically align only the first pole of a multi-pole construction. This is accomplished by forming the mating bracket and pole surfaces in a manner such that the pole surfaces are parallel to the longitudinal axis of the pole and are generally flat in nature while the bracket surfaces are formed generally perpendicular to the longitudinal axis of the bracket. Therefore, after establishing the vertical alignment of the first pole with respect to the pole mounting surfaces, a bracket is secured to the pole by connecting means and is thereby made to rest at a right angle with respect to the axis of the pole. A second pole can therefore be connected to the opposite end of the bracket and secured thereto.

When this is done, the second pole, due to the construction of the mating surfaces of the poles and brackets, will also be vertically aligned. While the specification is directed primarily to the vertically aligned brackets and poles, the scope of the invention includes other angular relationships formed in the same manner.

Panels may be secured to the supporting structure in both vertical and horizontal directions without displacement of the previously aligned poles. To assist in the assemblage of vertically depending panels and vertically ascending panels to the same bracket, an insert was developed as part of the invention for connection to the bracket. Specially designed panels can be made to serve as lift front and drop front panels and sliding drawer supports without substantial change. Horizontally supported panels can be produced having edges which can be readily adapted, using interchangeable insert tracks, to support vertically disposed sliding panels and vertically disposed fixed panels. Simple, inexpensive fixtures have been devised for use in conjunction with the poles, brackets and panels of the invention to provide a time and cost savings means for erecting partitions, cabinets, furniture, book cases, files, etc. and combinations thereof having sliding doors, drawers, drop fronts, lift fronts, tip out drawers, etc. The dimensions of any of the parts of a particular construction can be varied to accommodate the needs of and requirements of any particular user.

Since the spacing and organization of the brackets with respect to each other and with respect to the poles is virtually infinite, it is possible, utilizing the elements of this invention, to produce a great variety of configurations and structures. The panels which are designed for use with the pole and bracket elements of the invention are equally versatile in being readily adaptable for use with any desired bracket pole spacing.

The poles of the invention are designed to receive a locking member which is connected to the bracket in a manner such that the adjustment of the locking member acts to firmly secure the bracket to the pole in vertically aligned relationship with respect to the axis of the pole. The means developed for adjusting the locking member to secure the bracket to the pole have been designed for compactness, simplicity and reliability of operation. To reduce assembly time and the number of tools required, the number and complexity of operative locking member parts has been reduced to a minimum. The means devised for moving the locking member into locking engagement with the pole, when actuated, produces positive engagement with a complementing element on the pole and over a substantial contacting area to thereby produce a solid cantilevered structure.

Further, to promote an appealing assembled esthetic appearance, the locking member and adjusting means have been enclosed within the bracket and the pole. In this manner a minimum amount of space is required and extraneous protruding structures can be done away with to simplify the assembly of panels to the bracket structure.

Securement fixtures for attaching panels to poles, hinges to poles, panel lift and drop arms to panels and poles, and tip-out drawer pivot elements, etc. to poles have configurations which permit pairs of such fixtures or combinations of any of the fixtures to be mounted in side by side relationship on the same pole in the same vertical space. While the fixtures can be secured to a pole in mating alignment, they can be staggered along the length of a pole as required in a particular arrangement. Also, in certain structural arrangements, the fixtures may be secured to panels instead of to poles.

The tip-out drawer of the invention is balanced between poles of the support arrangement with a pivot offset advantage. This permits the opening and closing of the drawer under balanced load conditions with a minimum of exertion. The drawer rotates downwardly to open; and when open, the outermost end of the drawer projects beyond the plane of the poles for greater accessibility. When closed, the drawer is flush with the plane of the poles. By overbalancing the drawer it remains in a wholly open or wholly closed position in cooperation with pivot stop elements normally secured to poles of the structural arrangement.

The invention, therefore, provides a structural supporting unit, a structure and a method for erecting a structure. Poles of the invention can be free standing, wall mounted or secured to another structure. Poles are formed with at least one channel which ordinarily extends substantially the entire length of the pole. This channel communicates with the interior and exterior of the pole through a longitudinally extending slot which has a smaller transverse dimension than the corresponding transverse dimension of the channel. The bracket which is assembled to the pole has a movable locking member connected to at least one of its ends. This locking member is designed for insertion into the channel of the pole whereby upon adjustment of the locking member the bracket may be firmly anchored to the pole. The panels of the invention are designed for simple and expeditious connection to connecting means on the brackets and poles and provide vertical and horizontal walls, interchangeable drawers, lift and drop panels, sliding doors, and tip-out containers. The fixtures used to connect the panels to the poles are of complementing configurations and permit the securement of two such fixtures to a single pole in the same plane with a resultant reduction in vertical space mounting requirements.

Various objects and advantages of the invention will hereinafter become more fully apparent from the following description of the drawings illustrating presently preferred embodiments thereof, and wherein:

FIG. 1 is a perspective view of a vertical pole-horizontal bracket structural support unit of the invention;

FIG. 2 is a cross section of the pole shown in FIG. 1;

FIG. 3 is a cross section of another embodiment of a pole of the invention;

FIG. 4 is a front elevation of the pole of FIG. 3;

FIG. 5 is a perspective view of a bracket with parts broken away;

FIG. 6 is a perspective view of a pair of panel supporting inserts for the bracket of FIG. 5;

FIG. 7 is a perspective view of a locking member which is insertable in the open end of a bracket;

FIG. 8 is a plan view of the locking member of FIG. 7;

FIG. 9 is a side elevation of the locking member of FIG. 7;

FIG. 10 is a top view showing one of the pole embodiments in cross section and a top view of a bracket connected to it;

FIG. 11 is a side elevation of a pole and bracket assembly illustrating an actuator for securing the locking member to a pole;

FIG. 12 is a side elevation of a double pole and single bracket assembly and another embodiment of the locking member actuator;

FIG. 13 is a top view of the assembly of FIG. 12;

FIG. 14 is a side elevation of the yoke portion of the locking member actuator shown in FIGS. 12 and 13;

FIG. 15 is a side elevation of the locking member of FIGS. 12 and 13;

FIG. 16 is a side elevation of a pole and bracket assembly showing another embodiment of the locking member actuator;

FIG. 17 is a top sectional view of the assembly of FIG 16 taken along lines 17—17;

FIG. 18 is a side elevation of the locking member actuator of FIGS. 16 and 17;

FIG. 19 is a sectional view of the operator of FIG. 18 taken along lines 19—19;

FIG. 20 is a side elevation of the locking member of FIGS. 16 and 17 with the actuator shown in operative relation;

FIG. 21 is a side elevation of a pole and bracket assembly illustrating another embodiment of the locking member and actuator;

FIG. 22 is a side elevation of the locking member of the assembly of FIG. 21;

FIG. 23 is a top view of the member of FIG. 22 illustrating the means for actuation in dotted lines; and FIG. 24 is a top view of the assembly of FIG. 21 with parts broken away illustrating the locking member and actuator in operative relation.

The basic structural support arrangement of the invention is shown in FIG. 1 of the drawings. A pair of poles, each designated 1, are supported upon suitable adjustable pedestals 2 such as those shown in the patent to R. Beal, No. 2,940,718 and in the application of Carl B. Hinrichs, Ser. No. 255,317, filed Jan. 31, 1963, now United States Patent 3,228,646, granted Jan. 11, 1966. These pedestals may be either spring loaded or adjustable in a manner such that a spring loaded top adapter 3, also shown in the above references, may be put into firm engagement with a ceiling or other structure. In some applications of the arrangement of the invention it may be desirable to reverse the pedestal and the top adapter so that the adjustable device is at the top rather than at the bottom. In other applications pedestals and top adapters may not be used, and the pole may be mounted and secured to or supported solely by a wall. The supporting structure may be free standing in applications where more than a pair of poles is employed.

In normal installations, the first pole is vertically aligned and plumbed by suitable aligning and leveling means. Where such a pole is installed between a ceiling and floor such as is shown in FIG. 1, the pedestal 2 is adjusted to firmly bias the spring loaded top adapter 3 into engagement with a ceiling and to maintain the pole in its vertically supported position. At this point, horizontal brackets 4 may be secured to the pole in a manner hereinafter to be more fully described; and, due to the unique construction of the pole and bracket arrangement, a second pole can be connected to the opposite bracket ends and when firmly secured thereto will also be positioned in plumb and parallel alignment with the first pole. The pedestal and top adapter of the second pole can then be adjusted to establish a firm mounting between the ceiling and the floor.

In the unit shown in FIG. 1, additional horizontal brackets can be connected to the poles to provide outstretching supporting structures.

The pole cross-section shown in FIG. 2 comprises a generally X-shaped member 5. The ends of each of the legs of the X-shape 5 are provided with a pair of opposed flanges 6 which extend at about 45-degree angles to each of the respective legs. These flanges 6 are spaced from one another in a manner such that receiving chambers 7 are provided between each of the pair of legs of the X-shape. These receiving chambers 7 communicate with the exterior of the leg through slots 8 which have smaller transverse dimensions than the largest transverse dimension of the receiving chambers. The walls 9 of the receiving chambers opposite the outer surface flange walls 10 are positioned in parallel alignment with them to facilitate the firm connection of a bracket locking member to the pole.

A second embodiment of a pole of the invention is shown in FIGS. 3 and 4 and in the application of Carl B. Hinrichs et al., Ser. No. 328,610, filed Dec. 6, 1963 for "A Structural Pole Assembly," now United States Patent 3,228,416, granted Nov. 29, 1966. This second pole, generally designated 11, has a rectangular configuration in cross section. Opposed faces 12 are flat, as shown in FIG. 3, and are positioned in parallel alignment. The outermost ends of faces 12 are provided with longitudinally extending grooves 13 and slightly enlarged lip-like edges 14 which act, when a vinyl or other surfacing material is adhesively bonded to faces 12, to contain any excess adhesive which may have accumulated during the bonding of the surfacing material to faces 12. Side walls 15 of pole 11 cooperate with opposing walls 16, forming part of receiving chambers 17, through slot 18 to provide a means for connecting a bracket member to the pole as will be discussed subsequently.

A bracket 4 of the invention is illustrated in FIG. 5. As is shown, the cross-section of bracket 4 is generally rectangular and includes parallel vertical side walls 19 connected by horizontal walls 20 and 21 which define a rectangular caviey 22 extending the length of the bracket and open at both ends thereof. The horizontal top wall 21 is formed with a dovetail 23 slot extending the full length of the bracket. A pair of opposed laterally extending flanges 24 project from each of the side walls 19 about half way between the top and bottom thereof and extend the length of the bracket. These flanges 24 serve both as panel supports, as will be discussed below, and as lateral bracket stiffeners. In the preferred method of producing brackets, the entire bracket, as shown in FIG. 5, is formed as a one-piece aluminum extrusion.

Bracket inserts 25, shown in FIG. 6, are fabricated from spring steel having a generally rectangular configuration as shown. The bottom dovetail portion 26 is provided with an axial slot which extends the length of the insert and establishes communication with the chamber defined by the walls of the insert. Opposing walls of the insert may then be compressed and dovetail portion 26 inserted into the generally complementing slot 23 of the bracket. The resilient response of the spring steel insert 25 in slot 23 acts to maintain the insert in a predetermined axial position on the bracket 4.

FIGS. 10 and 11 illustrate a bracket 4, as shown in FIG. 5, secured to a pole 11 of the type shown in FIG. 3 although in most instances poles 1 and 11 can be interchanged. The means for securing the bracket 4 to the pole 11 comprises a vertically elongated T-shaped locking member which is generally designated 27. The locking member is inserted into cavity 22 at an end of the bracket. The locking member 27 is shown in FIGS. 7, 8 and 9 to have an elongated body 28 with opposed flanges 29 and 30 at one of its ends to provide the generally T-shaped configuration of the member. The innermost surface 31 of locking member 27 is provided with a threaded opening 32 into which the threaded end 33 of locking member actuator 34 is threaded. As is shown in FIG. 11, locking member actuator 34 is provided with a pair of threaded ends 33 and 35 each of which is threaded into the end of a locking member 27 positioned at opposite ends of bracket 4. The actuator 34 can, therefore, be rotated by a tool, such as a small wrench, which is inserted into either of the slots 36 provided in side walls 19 of bracket 4 and into engagement with a hexagonal portion of actuator 34. The rotation of actuator 34 shown in FIG. 11 will, therefore, simultaneously retract the flanges 29 and 30 of the bodies 28 of locking members 27 toward the ends of bracket 4 or will cause the extension of the flanges 29 and 30 from the bracket extremities.

In the normal attachment of a bracket 4 to a pole, the locking member actuator 34 is set in a position placing flanges 29 and 30 in their extended position. The flanges 29 and 30 are then inserted, from either the top or bottom of pole 11, into receiving chambers 17 of the pole. The bracket 4 and locking member 27 may be moved upwardly or downwardly on the pole utilizing receiving chamber 17 and slot 18 as a track and may be aligned on the pole in an infinite number of positions.

In some applications, however, it may be desired to insert the bracket from a position intermediate the extremities of the pole. In such an application the pole slots 18 in a predetermined area of the pole are enlarged (not shown) both laterally and vertically to a dimension large enough to permit insertion of the flange portions 29 and 30 of locking member 27 into receiving chamber 17. Once inserted, the locking member can be moved either upwardly or downwardly on the pole from the point of slot enlargement and secured to the pole in a desired position.

When the bracket 4, as shown in FIGS. 10 and 11, has been moved to its desired vertical position on the pole 11, the locking member actuator is rotated by a wrench or other suitable tool inserted through slot 36 and into engagement with the hexagonal portion of the actuator. The rotation produces the retraction of locking member 27 and brings the inner surfaces of flanges 29 and 30 into surface-to-surface engagement with walls 16 and the end surfaces of bracket 4 into opposing surface-to-surface engagement with side walls 15 of pole 11 or the walls 9 and 10 (shown in FIG. 2) where a pole 1 is employed. In describing the attachment of brackets 4 to pole 11 it is understood that the procedures described apply equally to pole 1.

Since the height of the locking member 27 almost equals that of bracket 4, a surface-to-surface engagement of substantial area is produced between the locking member, pole and bracket in the connection of the bracket to the pole in the manner described above. Such substantial area engagement results in a very rigid high-strength bracket attachment which will not readily become loose due to prolonged use. Further, the width of body 28 of locking member is ordinarily maintained close to that of either of the slots 7 or 18 of poles 1 and 11, respectively. The rigidly attached bracket due to its substantial load bearing surface is thereby effectively prevented from deflecting vertically or horizontally with respect to its initial attachment position.

By employing ordinary machining and extrusion techniques in the production of the structural elements, the engaging bracket, pole and locking member surfaces will, in the preferred embodiment, assume a vertical relationship with respect to each. However, other bracket and pole angular relationships can be produced, as desired, utilizing conventional machining and extrusion techniques.

Since the bracket can be relied upon to establish a vertical relationship with a pole when attached, only one pole need be leveled and plumbed in a multi-pole, multi-bracket installation. Each element of such an installation, when installed, will automatically establish a vertical relationship with respect to the element or elements to which it is connected obviating additional time-consuming and costly leveling operations.

While the embodiment in FIGS. 10 and 11 shows an actuator 34 connected between a pair of opposed locking members 27 which can be actuated to simultaneously connect a pair of poles to a single bracket, the bracket could be readily modified to provide a pair of independently operable actuators or a single actuator for one end of the bracket. These modifications would depend upon the end use of the bracket, e.g. a free-standing horizontal supporting bracket or a bracket joining a pair of poles, both as shown in FIG. 1.

A second bracket attachment construction is illustrated in FIGS. 12-15. The basic pole and bracket assembly shown is substantially identical to that of the previous embodiment and where applicable the same reference numbers are used. As can be seen from FIGS. 13 and 14, a yoke or U-shaped member, generally designated 37, is formed with a pair of oblong slots 38, one in each of the opposed legs of the yoke 37 and in alignment with each other. As shown in FIG. 14, the oblong slot 38 has a longitudinal axis aligned at an oblique angle with respect to the longitudinal axis of the yoke.

A locking member 39, similar in overall configuration to locking member 27, is formed with a body portion 40 and opposed flanges 41 and 42 projecting laterally therefrom. The body portion 40 of member 39, as shown in FIG. 15, is provided with an opening 43 of generally oblong configuration having a longitudinal axis in generally normal relationship to the longitudinal axis of the locking member. Opening 43 extends laterally and completely through body portion 40. A counter-bored passage 44 (shown in FIG. 15) is provided in the upper surface of body 40 and communicates with opening 43.

The body 40 of the locking member 39 is inserted between the opposed legs of yoke 37. When inserted the opening 43 in body 40 is in partial register with the aligned slots 38 in the opposed legs of yoke 37. A cylinder 45 is inserted into the opening provided by the alignment of body 40 with yoke 37 and is supported by the legs of the yoke and body 40 bordering the opening. While a cylinder is shown in the preferred embodiment, a number of configurations would suffice. A bolt 46 is inserted into counter-bore 44 and threaded into cylinder 45. The bolt has a head adapted to be tuned by an Allen wrench although other operative head configurations could be adopted. When bolt 46 is rotated in one direction, the cylinder 45 into which it is threaded is moved upwardly. This upward movement of cylinder 45, due to the oblique angular relationship of the slots 38 in the opposed legs of the yoke 37, also produces a cylinder movement from left to right, as can be seen in FIG. 14. Since cylinder 45 spans slots 38 and passes through opening 43 of locking member 39, the locking member is also moved from left to right by the bolt induced movement of the cylinder. Movement in the opposite direction is produced by reversing the rotation of bolt 46.

The yoke 37, locking member 39, cylinder 45 and bolt 46 assemblage is inserted as a unit into an open end of cavity 22. As shown in FIGS. 12 and 13, one unit is inserted into each of the bracket ends with the outermost edges thereof in alignment with the end surfaces of bracket 4. The yoke members 37 and thereby the units formed by the assemblage of parts are secured within the respective ends of cavity 22 by pins or rivets 47 anchored in side walls 19. An opening 48 is provided in top wall of bracket 4 to expose bolt 46 for operation through dovetail slot 23.

With the cylinder 45 in its lowermost position and thereby locking member 39 in its extended position with respect to the bracket, flanges 41 and 42 are inserted into receiving chamber 17 of pole 11 and the bracket is moved to its desired position on the pole. As shown in FIGS. 10 and 11, the bracket is simultaneously connected to a pair of poles 11. When the bracket has been aligned between the poles, bolts 46 are rotated utilizing an Allen wrench or other suitable tool inserted into top wall opening 48 of the bracket. As bolts 46 are rotated in counter-bore 44 of locking member body 40, cylinders 45, spanning body openings 43 and slots 38 of yokes 37 and into which the bolts are threaded, are raised in a generally vertical direction with respect to the longitudinal axis of the bracket. As cylinders 46 are raised, they are deflected inwardly of the yoke by the angularly disposed slots 38, shown in FIG. 14. The portions of cylinders 46 extending through the generally vertical openings 43 of the locking members 39 act against the surfaces bordering openings 46 and move locking member 39 inwardly of the yoke 37. As locking member 39 is moved inwardly, flanges 41 and 42 of the locking member are brought into engagement with walls 16 of poles 11. The bracket surfaces opposite the flanges act in conjunction with the flanges and in response to the rotation of bolts 46 and movement of cylinders 45 to produce a compressive engagement of the pole walls 15 and 16 between bracket 4 and locking members 39. This connection of bracket and poles, as in the case with the previous embodiment, produces a rigid and angularly aligned construction having high load bearing characteristics with a minimum of problems due to deflection when subjected to such loads.

A third bracket attachment construction is shown in FIGS. 16 through 20. In this embodiment pole 1, as shown in FIG. 2, is used as the supporting structure for the attachment of a bracket 4, although poles 1 and 11 can generally be interchanged in the embodiment of the invention. As is shown in FIGS. 17 and 20, the locking member 49 is similar in most respects to those of the previous embodiments. It comprises a body portion 50 and opposed flanges 51. In this instance, however, the front faces of the flanges are chamfered at 52 to conform to the configuration of receiving chamber 7 of the pole.

The body portion 50 of the locking member is inserted into cavity 22 of the bracket 4. The body 50 of the locking member is provided with an elongated slot 53 which extends generally vertically with respect to the longtiudinal axis of the body. When the locking member 49 is inserted into the cavity 22 of the bracket, slot 53 is brought into register with circular openings 54 in the side walls 19 of the bracket. These circular openings are located in registry with each other on opposed surfaces of the bracket as shown in FIG. 17.

After the slot 53 and circular openings 54 have been aligned, a cam 55, as is shown in FIGS. 18 and 19 to be formed of a pair of plate-like circular end faces 56 and 57 connected by an eccentrically positioned cylinder 58, is connected to the bracket and locking member 49. This is done by separating end plate 57 from eccentric cylinder 58 and inserting the cylinder 58 and attached end plate 56 into the circular opening 54 in bracket 4 in a manner such that end plate 56 is flush with the outer surface of side-wall 19 of bracket 4, as shown in FIG. 17, and cylinder 58 projects into slot 53 and through it into the circular opening 54 on the opposite surface of the bracket. Plate 57 is then secured to the projecting end surface of cylinder 58 as is shown in FIG. 19. The end surfaces of cam 55 are formed with hexagonal holes 59 which are adapted to receive an Allen wrench or other suitable rotating tool.

When cam 55 has been assembled to the bracket 4 and the body portion 50 of locking member 40, end plates 56 and 57 lie securely but rotatably in circular openings 54 of the bracket. The eccentric cylinder 58 is positioned in contact with surfaces of slot 53. To operate the locking member 49, an Allen wrench is inserted into one of the openings 59 of the cam which is then rotated in either a clockwise or counterclockwise direction. As the cam 55 is rotated, the eccentric cylinder 58 is rotated and being in constant contact with the surfaces of slot 53 serves to move the locking member 49 inwardly and outwardly with respect to the end surface of the bracket 4. For example, the cam as shown in FIGS. 18 and 19 has the eccentric cylinder 58 positioned in the three o'clock position and thereby would urge the locking member 49 into its most retracted position. In FIGS. 16 and 17, the eccentric cylinder is shown in a downward or six o'clock position. In this position the locking member is made to assume an intermediate position between fully retracted and fully extended. When the cam 55 is rotated to the nine o'clock position (not shown) the locking member 49 against which the eccentric cylinder 58 is urged is placed in its most extended position with respect to the end surface of bracket 4.

The assembly of a bracket 4 carrying a locking member 49 to a pole 1 is accomplished in much the same manner as in the previous embodiments. In this instance, cam 55 is rotated to place the locking member 49 in its extended position. When the locking member has been placed in its extended position, the opposed flange portions 51 are inserted into receiving chamber 7 of the pole and the bracket is moved to its desired vertical position on the pole. When the pole and bracket position has been established, an Allen wrench is inserted into hole 59 and the cam is rotated toward the three o'clock position to retract the flanges 51 and to produce the rigid engagement of the flanges 51 with receiving chamber walls 9 and the end surfaces of the bracket 4 with the outer flange walls 10 of pole 1. This therefore produces a rigid compressive engagement of the pole between the locking member flanges and the bracket end surfaces.

FIGURES 21 through 24 illustrate an additional construction for attaching a bracket 4 to a pole 11. In this embodiment the locking member 60 shown specifically in FIGS. 22 and 23 is formed with a generally T-shaped cross-section as is seen in FIG. 23. The body portion 61 is provided with a recess 62 at an end thereof. At the opposite end of body 61 opposed flanges 63 and 64 similar in most respects to those of the previous embodiments are provided. The recessed portion of the body 61 is formed with an inwardly directed conical aperture 65.

As was the case with the previously described constructions, the locking member 60 is inserted into cavity 22 of bracket 4. The opposed flanges 63 and 64 propect from the end of the bracket into which the locking member 60 has been inserted. The conical aperture 65 provided in recess portion 62 of body 61 is, upon insertion into cavity 22, aligned with a circular opening 66 bored through side wall 19 of the bracket 4. A cylindrical member 67 is threaded into side wall opening 66. Cylindrical member 67 is formed with an axial bore 68 which is threaded to receive a screw 69. Screw 69 is formed with a conical head 70 complementing the conical aperture 65 of the locking member 60. The opposite end of screw 68 is provided with a hexagonal hole 71 into which a rotating tool such as an Allen wrench can be inserted and operated.

To install the bracket on the pole, screw 69 in cylindrical member 67 is rotated until conical head 70 is partially withdrawn from the cavity 22 of the bracket. This acts to release locking member 60 and to permit the extension of opposed flanges 63 and 64 a distance from the extremity of the bracket. Flanges 63 and 64 are then inserted into receiving chamber 17 of pole 11 which acts in combination with slot 18 as a slide track for the locking member 60. The bracket and locking member are moved to a desired vertical position on the pole.

After the bracket has been suitably positioned on the pole, screw 69 is rotated in threaded bore 68 and into cavity 22 of the bracket. Screw 69 enters the cavity 22 in the area of the recessed portion 62 of locking member 60 and in alignment with at least a portion of conical aperture 65 therein. As the conical head 70 of the screw engages the conical surface of aperture 65 in the manner shown in FIG. 24, the body portion 61 of locking member 60 is moved inwardly relative to the end of the bracket from which the locking member projects. This is accomplished as the conical head of screw 69 is urged against the innermost surface defining aperture 65. The mechanical retraction of the locking member produces a compressive engagement of pole surfaces 15 and 16 between the bracket extremity and the innermost surfaces of flanges 63 and 64 with a resulting rigid pole and bracket assembly. By reversing the rotation of screw 69, the compressive engagement of the pole by the bracket can be released.

The structural arrangement of the invention therefore provides a system where an infinite combination of supports, enclosures, closures, etc. can be employed depending upon specific needs. The elements of the structural arrangement of the invention are for the most part interchangeable, and the interchange of the elements can be generally accomplished without displacement of the basic pole structure.

I claim:

1. An elongated pole mountable bracket having a generally rectangular cross section, transversely extending supporting elements provided on at least a wall of the bracket, a wall of the bracket being provided with a slot extending substantially the entire longitudinal axis of the wall and providing a chamber in communication therewith for insertion therein of an insert member having a portion substantially complementing the cross sectional configuration of the chamber and means on the bracket for securing the bracket to a pole.

2. In an elongated mountable bracket having a generally rectangular cross section, transversely extending reinforcing elements secured to opposed walls of the brackets, one of the unreinforced walls being provided with a slot extending substantially the entire longitudinal axis of the wall and providing a chamber in communication therewith having a generally dovetailed configuration for insertion therein of an insert member and means on an end of the bracket for securing the bracket to a pole.

3. The mountable bracket of claim 2 wherein an elongated insert member having a dovetailed projection extending along its longitudinal axis is positioned in the complementing slot of the bracket.

4. The bracket of claim 3 wherein the insert has a generally U-shaped configuration with the dovetailed projection extending from the base of the U.

5. A bracket for mounting upon a pole comprising a body, the body having at least a hollow end portion, a movable generally T-shaped locking member provided in the hollow end portion of the body and projecting therefrom, the generally T-shaped locking member having a generally flat elongated base section projecting from the body of the bracket and a laterally enlarged head section on the outermost extremity of the base section for engagement with an element of a pole, means in the body linked to the T-shaped locking member for connecting the member to the body and means for adjusting the position of the T-shaped locking member with respect to the end of the body from which it projects when the body is mounted upon a pole for firmly securing the body to an element of the pole.

6. The bracket of claim 5 wherein the means for adjusting the position of the T-shaped locking member with respect to the end of the body is accessible and adjustable from the exterior of the body.

7. The bracket of claim 5 wherein the means for adjusting the position of the T-shaped locking member with respect to the end of the body includes a rod having an end connected to the locking member and another end threadably connected to the body and access means for permitting rotation of the rod to produce either outward or inward movement of the locking member.

8. A bracket for mounting upon a pole comprising a body, the body having an opening in an end thereof, movable means provided in the opening of the body and extending therefrom, engaging means on the outermost end of the movable means for engagement with an element of a pole, cam means journalled in the body and in the movable means, means for rotating the cam means to produce movement of the movable means with respect to the body when the body is mounted upon a pole for firmly securing the body to the pole.

9. The bracket of claim 8 wherein the cam means comprises a pair of circular plates positioned in parallel alignment and connected by a cylindrical shaft disposed eccentrically with respect to the centers of the plates, the circular plates being journalled in complementing openings in the body and the cylindrical shaft being positioned in contact with the movable means whereby rotation of the cam produces the movement of the movable means and engaging means when the body is mounted upon a pole for firmly securing the body to the pole.

10. The bracket of claim 9 wherein the movable means comprises a plate provided with a slot extending in generally normal relationship to the longitudinal axis of the plate and the cylindrical shaft of the cam means projects through the slot and is engageable with the surfaces defining the slot.

11. A bracket for mounting upon a pole comprising a body, the body having an opening in an end thereof, movable means provided in the opening of the body and extending therefrom, engaging means on the outermost end of the movable means for engagement with an element of a pole, the movable means being provided with a hole having inwardly converging surfaces, and means on the body having a surface engageable with the converging surfaces defining the hole for adjusting the position of the movable and engaging means with respect to the opening in the body when the body is mounted upon a pole for firmly securing the body to the pole wherein the hole has a generally conical configuration and the adjusting means comprises a screw threaded through the body and into communication with the cone-shaped hole and having a tapered end engageable with the conical hole surface to produce the movement of the movable means in response to the wedging action of the threaded screw against the surface of the conical hole and the movable means for adjusting the position of the movable and engaging means with respect to the opening in the body when the body is mounted upon a pole for firmly securing the body to the pole.

12. The bracket of claim 11 wherein the movable means is a plate having an enlargement at the ends extending from the body for engagement with a pole, the screw is threaded through the body a predetermined distance from the end from which the plate extends, the conical hole in the plate is spaced a predetermined distance from the enlargement at the extended end thereof whereby the inward movement of the screw into engagement with the conical surfaces of the hole produces a retraction of the enlargement toward the end of the body to secure the bracket to a pole.

13. A structural support unit comprising a pole, the pole being formed with a channel extending substantially the entire length of the pole, the pole having a longitudinally extending slot providing communication between the channel and exterior of the pole, the transverse dimensions of the slot being smaller than the transverse dimensions of the channel, a bracket mounted on the pole, the bracket having a hollow portion of the bracket opening from an end of the bracket, a locking member disposed within the hollow portion in the end of the bracket and projecting from the opening thereof, the outermost end of the locking member being formed with an enlarged head inserted in the channel and having a greater transverse dimension than the pole slot and a lesser transverse dimension than the pole channel and being slidable along the longitudinal axis of the pole channel, the locking member having a neck connected to the head of the locking member and extending to the bracket, the neck being movable longitudinally on the pole in the slot, and means linked to the neck of the locking member for moving the head of the locking member toward and away from the end of the bracket to establish the firm engagement of the head with at least one of the walls defining the pole channel and for moving the end of the bracket into firm head opposing engagement with the pole to produce an assembled structural support unit adapted for a variety of uses.

14. The structural support of claim 13 wherein the linking means is connected to a locking member at another end of the bracket.

15. A bracket for mounting upon a pole comprising a body, the body having at least a hollow end portion, a movable locking member provided in the hollow end portion of the body and projecting therefrom, the locking member having a generally flat elongated section projecting from the body and a laterally enlarged head section at its outermost extremity for engagement with an element of a pole, means in the body linked to the locking member for connecting the member to the body and means for adjusting the position of the locking member with respect to the end of the body from which it projects when the body is mounted upon a pole for permanently securing the body to the element of the pole, the adjusting means including a rod having one end thereof threadably connected to the locking member and another end threadably connected to a second movable member disposed opposite the locking member to permit the simultaneous movement of both members.

16. A bracket for mounting upon a pole comprising a body having a hollow portion, the hollow portion of the body opening from an end of the body, a generally flat plate having a slot aligned at a pre-determined angle with respect to the longitudinal axis of the plate and disposed for movement in the hollow portion of the body and with respect to the opening thereof, engaging means on the outermost end of the flat plate for engagement with an element of a pole, a U-shaped member disposed in the hollow portion of the bracket body in surrounding relationship with respect to the flat plate in the hollow portion of the body and having a slot in at least one of the legs of the U disposed in partial alignment with the slot of the flat plate but at a different angle than the slot of the flat plate, the U-shaped member being secured to at least one wall forming the hollow portion of the body, a movable member positioned in the slot of the U-shaped member and extending into the slot of the flat plate, and means for actuating the movable member to move it from one position to another to produce the movement of the flat plate with respect to the body of the bracket in response to the actuating means for firmly securing or releasing the engaging means on the outermost end of the flat plate to a pole.

17. The bracket of claim 16 wherein the longitudinal axis of the slot of the flat plate is alingned in generally normal relation to the longitudinal axis of the flat plate, each of the legs of the U-shaped member being provided with slots in alignment with each other and in at least partial alignment with the slot of the flat plate, the aligned slots of the U-shaped member being disposed at an angle to the longitudinal axis of the flat plate other than normal to the axis thereof, and the movable member extending through each of the slots whereby the movement of the movable member in the slot produces the responsive movement of the flat plate.

18. A bracket for mounting upon a pole comprising a body, the body having an opening in an end thereof, a generally flat plate having a slot aligned at a predetermined angle with respect to the longitudinal axis of the plate and disposed for movement in the opening of the end of the body, engaging means on the outermost end of the flat plate for engagement with an element of a pole, means on the body adjacent the flat plate having a slot in at least partial alignment with the slot of the flat plate and disposed at a different angle than the slot of the flat plate, a movable member positioned in the slot of the means on the body, and extending into the slot of the flat plate, and screw means threaded into the movable member through a portion of the flat plate and into the slot thereof for actuating the movable member to move it from one position to another to produce the movement of the flat plate with respect to the body of the bracket in response to the action of the screw means for firmly securing or releasing the engaging means on the outermost end of the flat plate to a pole.

19. A bracket for mounting upon a pole comprising a body having a hollow portion, the hollow portion of the body opening from an end of the body, movable means provided in the hollow portion of the body and extending therefrom, engaging means on the outermost end of the movable means for engagement with an element of a pole, means linking the movable means with the body, and means for adjusting the position of the movable and engaging means with respect to the hollow portion in the body when the body is mounted upon a pole for firmly securing the body to the pole, said adjusting means including a rotatable rod having an end connected to the movable means and another end threadably connected to the body and access means for permitting rotation of the rod to produce either outward or inward movement of the movable means with respect to the body.

20. A bracket for mounting upon a pole comprising a body having a hollow portion, the hollow portion of the body opening from an end of the body, movable means provided in the hollow portion of the body and extending therefrom, engaging means on the outermost end of the movable means for engagement with an element of a pole, means linking the movable means with the body, and means for adjusting the position of the movable and engaging means with respect to the hollow portion in the body when the body is mounted upon a pole for firmly securing the body to the pole, said adjusting means including a rod having one end threadably connected to the movable means and another end threadably connected to a movable member disposed opposite the movable means to permit the simultaneous movement of both the movable means and the movable member.

References Cited

UNITED STATES PATENTS

| | | | |
|---|---|---|---|
| 1,844,696 | 2/1932 | Smily | 52—242 |
| 3,013,642 | 12/1961 | Hammitt et al. | 52—238 |
| 3,106,297 | 10/1963 | Schroeder | 211—148 |
| 3,128,852 | 4/1964 | Chell et al. | 52—731 |
| 3,195,937 | 7/1965 | Case | 287—54 |
| 2,940,718 | 6/1960 | Beal | 248—245 |
| 2,970,677 | 2/1961 | Springs | 52—239 |
| 3,042,221 | 7/1962 | Rasmussen | 211—148 |
| 3,096,108 | 7/1963 | Baybarz | 287—54 |
| 3,143,981 | 8/1964 | Tassell | 108—108 |
| 3,096,733 | 7/1963 | Jentzen | 108—158 |
| 3,178,775 | 4/1965 | Tassell | 20—4 |
| 3,228,646 | 1/1966 | Hinrichs et al. | 248—354 |
| 3,290,131 | 12/1966 | Neal | 248—28 |

FOREIGN PATENTS 253,948  8/1964  Australia.

ROY D. FRAZIER, Primary Examiner

J. FRANKLIN FOSS, Assistant Examiner

U.S. Cl. X.R.

108—148; 248—245; 287—54